(12) United States Patent
Cheng

(10) Patent No.: US 11,867,996 B2
(45) Date of Patent: Jan. 9, 2024

(54) SURFACE FINISHING METHOD, ANTI-GLARE COATING, AND DISPLAY DEVICE HAVING SAME

(71) Applicant: HUIZHOU CHINA STAR OPTOELECTRONICS TECHNOLOGY CO., LTD., Guangdong (CN)

(72) Inventor: Chingyuan Cheng, Guangdong (CN)

(73) Assignee: HUIZHOU CHINA STAR OPTOELECTRONICS TECHNOLOGY CO., LTD., Huizhou Guangdong (CN)

( * ) Notice: Subject to any disclaimer, the term of this patent is extended or adjusted under 35 U.S.C. 154(b) by 767 days.

(21) Appl. No.: 16/968,595

(22) PCT Filed: Jun. 5, 2020

(86) PCT No.: PCT/CN2020/094718
§ 371 (c)(1),
(2) Date: Aug. 9, 2020

(87) PCT Pub. No.: WO2021/227162
PCT Pub. Date: Nov. 18, 2021

(65) Prior Publication Data
US 2023/0141445 A1    May 11, 2023

(30) Foreign Application Priority Data
May 9, 2020  (CN) .......................... 202010387420.5

(51) Int. Cl.
G02F 1/1335    (2006.01)
C03C 17/00    (2006.01)
C03C 17/32    (2006.01)

(52) U.S. Cl.
CPC ...... *G02F 1/133502* (2013.01); *C03C 17/007* (2013.01); *C03C 17/326* (2013.01);
(Continued)

(58) Field of Classification Search
CPC .................... G02F 1/133502; G02F 1/133528
See application file for complete search history.

(56) References Cited

U.S. PATENT DOCUMENTS 6,164,785 A    12/2000  Maekawa
2005/0200771 A1*  9/2005  Lazarev ............... G09G 3/3406
349/62

FOREIGN PATENT DOCUMENTS

CN    101650447 A    2/2010
CN    101672935 A    3/2010
(Continued)

Primary Examiner — Anne M Hines
(74) Attorney, Agent, or Firm — Soroker Agmon Nordman Riba

(57) ABSTRACT

A surface finishing method, an anti-glare coating, and a display device having same are provided. The surface finishing method includes adding diffusion particles which have a density less than that of a resin material, and controlling the thickness of the resin material in an anti-glare material coated on a surface of a substrate to be greater than the particle size of the diffusion particles, so that the diffusion particles are evenly dispersed in the resin layer, and a part of the volume of the diffusion particles are exposed on a surface of the resin layer. Thus, the uniformity of the surface haze of the anti-glare coating can be enhanced, and flashing points of the display device can be avoided.

15 Claims, 2 Drawing Sheets

(52) U.S. Cl.
CPC .... *C03C 2217/48* (2013.01); *C03C 2217/732* (2013.01); *G02F 1/133528* (2013.01)

(56) References Cited

FOREIGN PATENT DOCUMENTS

| | | |
|---|---|---|
| CN | 105531606 A | 4/2016 |
| CN | 105938268 A | 9/2016 |
| CN | 106405689 A | 2/2017 |
| CN | 109031487 A | 12/2018 |
| CN | 109814187 A | 5/2019 |
| JP | H1020103 A | 1/1998 |
| JP | 200298813 A | 4/2002 |
| JP | 2019164189 A | 9/2019 |

\* cited by examiner

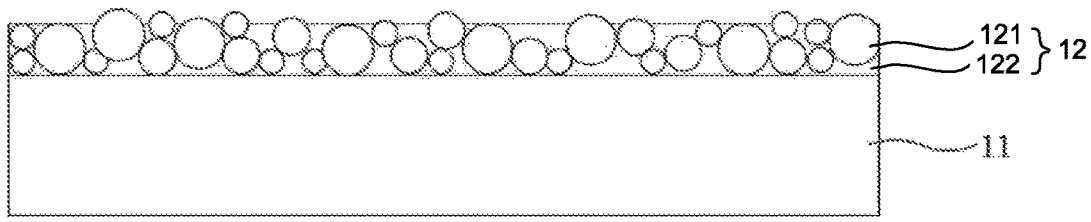

FIG.1

Providing a resin material, adding spherical diffusion particles into the resin material to form an anti-glare material, wherein the density of the diffusion particles is less than the density of the resin material — S1

Coating the anti-glare material onto a surface of a substrate, wherein the thickness of the resin material in the anti-glare material coated on the surface of the substrate is greater than the particle size of the diffusion particles — S2

Performing a curing process of the anti-glare material to cure the resin material to form a resin layer, wherein the diffusion particles are evenly dispersed in the resin layer and a part of the volume of the diffusion particles is exposed on a surface of the resin layer, thereby giving the substrate a predetermined surface haze — S3

FIG.2

SURFACE FINISHING METHOD, ANTI-GLARE COATING, AND DISPLAY DEVICE HAVING SAME

FIELD OF INVENTION

The present disclosure relates to the technical field of display, and especially relates to a surface finishing method, an anti-glare coating, and a display device having same.

BACKGROUND OF INVENTION

At present, an anti-glare surface finishing process achieves anti-glare effect by forming an anti-glare coating on a surface of a substrate, thereby increasing surface haze of the substrate, and thereby scattering and refracting light. The present anti-glare coatings are all transparent resin layers embedded with transparent diffusion particles. In the present anti-glare coatings, the surface haze of the anti-glare coating is controlled by changing particle sizes of the diffusion particles and a thickness of the resin layer. Refer to FIG. 1, which is a structural schematic view of an anti-glare coating 1 of prior art. To enhance the anti-glare effect of the anti-glare coating 12 disposed on a substrate 11, the particle sizes of diffusion particles 121 need to be enlarged and be made greater than a thickness of a resin layer 122, thereby exposing the diffusion particles 121 on a surface of the resin layer 122. Alternatively, the anti-glare effect of the anti-glare coating 1 may be enhanced by stacking the diffusion particles embedded in the resin layer, thereby exposing a part of the diffusion particles 121 on the surface of the resin layer 122, and thereby enhancing the surface haze of the anti-glare coating 1.

Technical Problem

If the particle sizes of the diffusion particles 121 in the anti-glare coating 1 are too large or if the anti-glare coating 1 comprises the diffusion particles of various particle sizes, then the diffusion particles 121 in the anti-glare coating 1 is likely to be unevenly distributed. Therefore, volume of the part of the diffusion particles 121 exposed on the surface of the resin layer 122 is uncontrollable and varies among the diffusion particles. The uneven distribution of the diffusion particles and the variation in volume results in uneven surface haze and different refraction capabilities for light in different parts of the anti-glare coating 1, thereby reducing the anti-glare effect of the anti-glare coating 1. If the anti-glare coating is applied to a high-resolution display device, then light penetrating a pixel is distorted when an area of the diffusion particle is greater than an area of two neighboring pixels, causing a flashing points problem in a panel of the display device.

Altogether, there are the problems of uneven haze of the surface of the anti-glare coating and flashing points in the panel of the display device caused by the excessively large particle sizes and the uneven distribution of the diffusion particles. Therefore, it is necessary to provide a surface finishing method, an anti-glare coating and a display device having same to overcome aforementioned defects.

SUMMARY OF INVENTION

Technical Solutions

The embodiments of the present disclosure provide a surface finishing method, an anti-glare coating and a display device having same to solve the problems that exist in the present substrate surface finishing process. The problems are insufficient haze of a surface of an anti-glare coating and flashing points in a panel of a display device caused by excessively large particle sizes of diffuse particles and uneven distribution of the diffusion particles.

The embodiments of the present disclosure provide a surface finishing method, comprising steps of:

providing a resin material, adding a plurality of spherical diffusion particles into the resin material to form an anti-glare material, wherein a density of the diffusion particles is less than a density of the resin material;

coating the anti-glare material onto a surface of a substrate, wherein a thickness of the resin material in the anti-glare material coated on the surface of the substrate is greater than a particle size of the diffusion particles; and performing a curing process of the anti-glare material to cure the resin material to form a resin layer, wherein the diffusion particles is evenly dispersed in the resin layer, and a part of a volume of the diffusion particles is exposed on a surface of the resin layer, thereby giving the substrate a predetermined surface haze.

According to an embodiment of the present disclosure, the particle size of the diffusion particle is kept constant, and the volume of the part of the diffusion particles which are exposed from the resin layer is changed by increasing or decreasing a difference in density between the resin material and the diffusion particles, thereby giving the substrate the predetermined surface haze.

According to an embodiment of the present disclosure, a difference in density between the resin material and the diffusion particles is kept constant, and the volume of the part of the diffusion particles which are exposed from the resin layer is changed by increasing or decreasing the particle size of the diffusion particles, thereby giving the substrate the predetermined surface haze.

According to an embodiment of the present disclosure, the particle size of the diffusion particles is in a range of between 2 μm and 8 μm, and a thickness of the resin layer is in a range of between 5 μm and 10 μm.

According to an embodiment of the present disclosure, an absolute value of a difference in particle size between the diffusion particles is less than or equal to 0.5 μm.

According to an embodiment of the present disclosure, a refractive index of the diffusion particles is in a range of between 1.3 and 1.5, and a refractive index of the resin layer is in a range of between 1.55 and 1.8.

According to an embodiment of the present disclosure, the diffusion particles include solid particles or hollow particles.

The embodiments of the present disclosure also provide an anti-glare coating, formed by curing a resin material and a plurality of spherical diffusion particles which has a density less than a density of the resin material, and comprising:

a resin layer; and the plurality of spherical diffusion particles which are evenly dispersed in the resin layer, wherein a part of a volume of the diffusion particles is exposed on a surface of the resin layer, and a thickness of the resin layer is greater than a particle size of the diffusion particles.

According to an embodiment of the present disclosure, the particle size of the diffusion particles is in a range of between 2 μm and 8 μm, an absolute value of a difference in particle size between the diffusion particles is less than or equal to 0.5 μm, and the thickness of the resin layer is in a range of between 5 μm and 10 μm.

According to an embodiment of the present disclosure, a refractive index of the diffusion particles is in a range of between 1.3 and 1.5, and a refractive index of the resin layer is in a range of between 1.55 and 1.8.

According to an embodiment of the present disclosure, the diffusion particles include solid particles or hollow particles.

The embodiments of the present disclosure also provide a display device, comprising: an LCD panel and a backlight module, wherein the LCD panel comprises an array substrate, a color film substrate, and a pair of polarizers; the array substrate and the color film substrate are opposite to each other; the polarizers are disposed on both outer sides of the array substrate and the color film substrate, respectively; an anti-glare coating is coated on a light emitting surface of the polarizer disposed on the outer side of the color film substrate away from the array substrate; the anti-glare coating is formed by curing a resin material and a plurality of spherical diffusion particles which has a density less than a density of the resin material; and the anti-glare coating comprises:

a resin layer; and the plurality of spherical diffusion particles which are evenly dispersed in the resin layer, wherein a part of a volume of the diffusion particles is exposed on a surface of the resin layer, and a thickness of the resin layer is greater than a particle size of the diffusion particles.

According to an embodiment of the present disclosure, the particle size of the diffusion particles is in a range of between 2 μm and 8 μm, an absolute value of a difference in particle size between the diffusion particles is less than or equal to 0.5 μm, and the thickness of the resin layer is in a range of between 5 μm and 10 μm.

According to an embodiment of the present disclosure, a refractive index of the diffusion particles is in a range of between 1.3 and 1.5, and a refractive index of the resin layer is in a range of between 1.55 and 1.8.

According to an embodiment of the present disclosure, the diffusion particles include solid particles or hollow particles.

Beneficial Effects

In the embodiments of the present disclosure, by adding the diffusion particles which have a density less than that of the resin material, and by controlling the thickness of the resin material in the anti-glare material coated on the surface of the substrate to be greater than the particle sizes of the diffusion particles, the diffusion particles are evenly floated on the surface of the resin material without increasing the particle sizes of the diffusion particles or stacking the diffusion particles, thereby evenly dispersing the diffusion particles in the resin layer. Therefore, part of the volume of the diffusion particles are exposed on the surface of the resin layer after the anti-glare coating is formed by curing, the surface haze of different parts of the anti-glare coating may be the same, the uniformity of the surface haze of the anti-glare coating can be enhanced, and flashing points of the display device can be avoided without excessively enlarging the particle sizes of the diffusion particles.

DESCRIPTION OF DRAWINGS

In order to clearly illustrate the technical solution in the embodiments of the present disclosure or the technical solution of the prior arts, the following briefly introduces the accompanying drawings used in the embodiments or in the description of the prior arts. Obviously, the drawings in the following description merely show some of the embodiments of the present disclosure. As regards one of ordinary skill in the art, other drawings may be obtained in accordance with these accompanying drawings without making creative efforts.

FIG. 1 is a structural schematic view of an anti-glare coating of the prior art;

FIG. 2 is a schematic flow chart of a surface finishing method provided by the embodiments of the present disclosure;

DETAILED DESCRIPTION OF PREFERRED EMBODIMENTS

Figure 3:
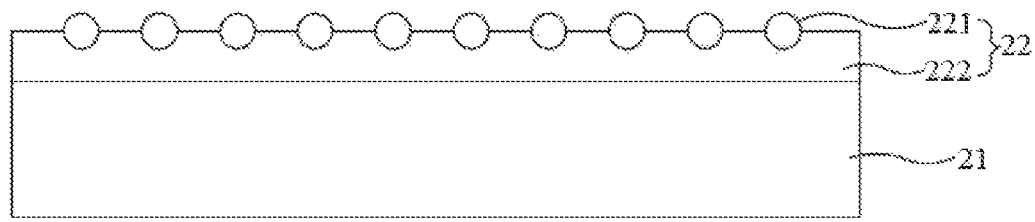
FIG. 3 is a structural schematic view of an anti-glare coating provided by the embodiments of the present disclosure.

The following description of the embodiments with reference to the accompanying drawings is used to illustrate particular embodiments of the present disclosure. The directional terms referred in the present disclosure, such as "upper", "lower", "front", "back", "left", "right", "inner", "outer", "side surface", etc. are only directions with regard to the accompanying drawings. Therefore, the directional terms used for describing and illustrating the present disclosure are not intended to limit the present disclosure. In the drawings, units with similar structures are indicated by the same reference number.

The present disclosure is further described as follows with reference to the accompanying drawings in the embodiments:

The embodiments of the present disclosure provide a surface finishing method. The surface finishing method is described in detail with reference to FIG. 2 and FIG. 3. Wherein FIG. 2 is a schematic flow chart of the surface finishing method provided by the embodiments of the present disclosure, and FIG. 3 is a structural schematic view of an anti-glare coating provided by the embodiments of the present disclosure.

The surface finishing method provided by the embodiments of the present disclosure comprising the following steps:

Step S1: providing a resin material, adding a plurality of spherical diffusion particles into the resin material to form an anti-glare material, wherein a density of the diffusion particles is less than a density of the resin material;

Step S2: coating the anti-glare material onto a surface of a substrate, wherein the thickness of the resin material in the anti-glare material coated on the surface of the substrate is greater than the particle sizes of the diffusion particles; and Step S3: performing a curing process of the anti-glare material to cure the resin material to form a resin layer, wherein the diffusion particles is evenly dispersed in the resin layer, and the part of the volume of the diffusion particles is exposed on a surface of the resin layer, thereby giving the substrate a predetermined surface haze.

In the step S1, the plurality of spherical diffusion particles 221 are transparent diffusion particles. The density of the diffusion particles 221 is less than the density of the resin material. In the step S2, because the thickness of the resin material is greater than the particle sizes of the diffusion particles 221, the diffusion particles 221 may be evenly coated onto the resin material and float on the resin material, such that part of the volume of the diffusion particles 221 is exposed on the surface of the resin material.

Specifically, each particle in the plurality of diffusion particles 221 in the step 1 has the same density. Each particle in the plurality of diffusion particles 221 in the step 1 also have the same particle sizes and refractive index, so each particle has the same mass and volume. Therefore, each of the diffusion particles receives the same buoyancy force. That is, the diffusion particles have the same height and volume exposed on the surface of the resin material and has the same ability to refract light.

In the step S3, anti-glare coating 22 formed by curing the anti-glare material comprises the resin layer 222 and the plurality of diffusion particles 221. The resin layer 222 is formed by curing the resin material. The diffusion particles 221 are also evenly distributed in the resin layer 222 with part of the volume exposed on the surface of the resin layer 222, and each have the same height and volume exposed on the surface of the resin material after curing since the diffusion particles 221 floats evenly on the surface of the resin material in step S2. Therefore, the substrate 21 may obtain the predetermined surface haze, and the surface haze of different parts of the anti-glare coating 22 may be ensured to be the same.

Specifically, due to the limitations of the production process, the particle sizes of the diffusion particles cannot be exactly the same. The buoyancy force received by each of the diffusion particles may be kept the same or be kept similar as long as the absolute value of the difference in the particle sizes between the diffusion particles is less than or equal to 0.5 μm. Therefore, the difference in height or volume of the part exposed on the surface of the resin material between each diffusion particles 221 is within tolerance. Thus, the difference in surface haze between each part of the formed anti-glare coating 22 is within tolerance. Thus, the uniformity of surface haze of the anti-glare coating 22 may be effectively enhanced, thereby enhancing the anti-glare effect of the anti-glare coating 22.

Optionally, in the step S1, the particle sizes of the diffusion particles 221 may be kept constant, and the height or volume of the part of the diffusion particles 221 which are exposed from the resin layer may be changed by increasing or decreasing the difference in density between the resin material and the diffusion particles 221, thereby giving the substrate 21 the predetermined surface haze. The difference in density between the resin material and the diffusion particles 221 can be changed by changing the density of the resin material and/or the density of the diffusion particles 221. The density of the resin material, the density of the diffusion particles 221, and the value of the difference in density may be determined base on the predetermined surface haze. In addition, the change in the difference in density between the resin material and the diffusion particles 221 may also cause change of the surface haze, so that the surface haze can be set and can be controlled according to the actual need.

Similarly, it is also possible to keep the difference in density between the resin material and the diffusion particles 221 constant to ensure that the diffusion particles 221 can float on the surface of the resin material. The height and volume of the part of the diffusion particles which are exposed from the resin layer 222 is changed by increasing or decreasing the particle sizes of the diffusion particles 221 and by increasing the overall volume of the diffusion particles 221, thereby obtaining the predetermined surface haze of the substrate 21.

Optionally, the diffusion particles 221 may be solid particles or hollow particles in the aforementioned method. The diffusion particles 221 should preferably be solid particles when the particle sizes are kept constant and the surface haze is controlled by changing the difference in density. The diffusion particles 221 should preferably be hollow particles when the density of the diffusion particles 221 is kept constant and the surface haze is controlled by changing the particle sizes. The hollow particles are lighter than the solid particles of the same volume, so it is easier to ensure that the hollow particles can float on the resin material, thereby reducing the difficulty of the surface finishing process.

Specifically, in the embodiments of the present disclosure, the particle size of the diffusion particles 221 is 5 μm, and the thickness of the resin layer 222 is 7 μm. Therefore, the diffusion particles 221 can be evenly distributed in the resin layer 222 and the part of the volume of the diffusion particles are exposed on the surface of the resin layer 222. Moreover, the problems that the too rough or non-smooth surface of the anti-glare coating 22 caused by the too small particle sizes of the diffusion particles 221 or flashing points of the display device caused by the too large particle sizes of the diffusion particles 221 are avoided.

Certainly, the particle size of the diffusion particles 221 is not limited to 5 μm. In some embodiments, the particle size of the diffusion particles 221 may also be 2 μm, 4 μm, 7 μm, or 8 μm etc. Similarly, the thickness of the resin layer 222 may also be 5 μm, 6 μm, 9 μm, or 10 μm etc. The aforementioned problems can be avoided as long as the particle sizes of the diffusion particles 221 ranges from 2 μm to 8 μm, and the thickness of the resin layer ranges from 5 μm to 10 μm. The specific parameters may be set according to the actual need and are not limited herein.

Specifically, in the embodiments of the present disclosure, the refractive index of the diffusion particles 221 should be less than the refractive index of the resin layer 222. The refractive index of the diffusion particles 221 should ranges from 1.3 to 1.5, and the refractive index of the resin layer 222 should ranges from 1.55 to 1.8. The specific parameters may be set according to the actual need and are not limited herein.

Specifically, in the step 1S, the diffusion particles 221 is made of $SiO_2$. In some embodiments, the diffusion particles 221 may also be made of inorganic martials selected from: Si, $Al(OH)_3$, $Mg(OH)_2$, $Al_2O_3$, $ZrO_2$, $TiO_2$, or any mixture thereof. Certainly, in some other embodiments, the diffusion particles 221 may also be made of polymer material and achieve the same technical effect as the aforementioned embodiments. The specific material may be selected according to the actual need and are not limited herein as long as the requirements of the diffusion particles 221, such as density or refractive index, are met.

Specifically, in the step S1, the resin material is transparent poly epoxy resin. The poly epoxy resin can be cured in the curing process of step S3 by ultraviolet light. Certainly, in some other embodiments, the resin material is not limited to poly epoxy resin. The resin material may also be other transparent resins, such as polyester resin and polyether resin etc., that can be cured by UV curing or heat curing. The same technical effect achieved by the poly epoxy resin in the aforementioned embodiments may also be achieved by the UV curable or heat curable resin. The specific material may be selected according to the actual need and are not limited herein.

The surface finishing method provided by the embodiments of the present disclosure can be applied to objects that need surface anti-glare finishing including but not limited to:

polarizers, touch panels, display devices, display panels, and glass. Other unspecified objects that need surface anti-glare finishing are also included. The included objects are not limited herein.

The beneficial effects of the embodiment of the present disclosure: In the embodiments of the present disclosure, by adding the diffusion particles which have a density less than that of the resin material, and by controlling the thickness of the resin material in the anti-glare material coated on the surface of the substrate to be greater than the particle sizes of the diffusion particles, the diffusion particles are evenly floated on the surface of the resin material without increasing the particle sizes of the diffusion particles or stacking the diffusion particles, thereby evenly dispersing the diffusion particles in the resin layer. Therefore, part of the volume of the diffusion particles are exposed on the surface of the resin layer after the anti-glare coating is formed by curing, the surface haze of different parts of the anti-glare coating may be the same, the uniformity of the surface haze of the anti-glare coating can be enhanced, and flashing points of the display device can be avoided without excessively enlarging the particle sizes of the diffusion particles.

The embodiments of the present disclosure also provide an anti-glare coating. The anti-glare coating is formed by curing the resin material and the plurality of spherical diffusion particles which has a density less than the density of the resin material. The anti-glare coating is described in detail with reference to FIG. 3.

As shown in FIG. 3, the anti-glare coating 22 is disposed on the substrate 21. The anti-glare coating 22 comprises the plurality of spherical diffusion particles 221 and the resin layer 222. The resin layer 222 is formed by curing the resin material. The thickness of the resin layer 222 is greater than the particle sizes of the diffusion particles 221. Before curing, the diffusion particles 221 with a density less than the density of the resin material are evenly distributed and float on the surface of the resin material. After curing, the diffusion particles 221 is evenly distributed in the resin layer, and part of the volume of the diffusion particles 221 is exposed on the surface of the resin layer 222.

In the embodiments of the present disclosure, each particle in the plurality of diffusion particles 221 has the same density. Each particle in the plurality of diffusion particles 221 also has the same particle sizes and refractive indexes, so each particle has the same mass and volume. Therefore, each of the diffusion particles receives the same buoyancy force before curing. That is, after curing, each of the diffusion particles 221 has the same height and volume exposed on the surface of the resin layer 222 and has the same ability to refract light. Therefore, each part of the anti-glare coating 22 has the same surface haze.

Specifically, due to the limitations of the production process, the particle sizes of the diffusion particles 221 cannot be exactly the same. The buoyancy force received by each diffusion particles 221 may be kept the same or be kept similar as long as the absolute value of the difference in particle size between the diffusion particles 221 is less than or equal to 0.5 μm. Therefore, the difference in height or volume of the part exposed on the surface of the resin material between each diffusion particles 221 is within tolerance. Thus, the difference in surface haze between each part of the formed anti-glare coating 22 is within tolerance. Thus, the uniformity of surface haze of the anti-glare coating 22 may be effectively enhanced, thereby enhancing the anti-glare effect of the anti-glare coating 22.

Specifically, in the embodiments of the present disclosure, the particle size of the diffusion particles 221 is 5 μm, and the thickness of the resin layer 222 is 7 μm. Therefore, the diffusion particles 221 can be evenly distributed in the resin layer 222 and the part of the volume of the diffusion particles are exposed on the surface of the resin layer 222. Moreover, the problems that the too rough or non-smooth surface of the anti-glare coating 22 caused by the too small particle sizes of the diffusion particles 221 or flashing points of the display device caused by the too large particle sizes of the diffusion particles 221 are avoided.

Certainly, the particle sizes of the diffusion particles 221 is not limited to 5 μm. In some embodiments, the particle size of the diffusion particles 221 may also be 2 μm, 4 μm, 7 μm, or 8 μm etc. Similarly, the thickness of the resin layer 222 may also be 5 μm, 6 μm, 9 μm, or 10 μm etc. The aforementioned problems can be avoided as long as the particle sizes of the diffusion particles 221 ranges from 2 μm to 8 μm, and the thickness of the resin layer ranges from 5 μm to 10 μm. The specific parameters may be set according to the actual need and are not limited herein.

Specifically, in the embodiments of the present disclosure, the refractive index of the diffusion particles 221 should be less than the refractive index of the resin layer 222. The refractive index of the diffusion particles 221 should ranges from 1.3 to 1.5, and the refractive index of the resin layer 222 should ranges from 1.55 to 1.8. The specific parameters may be set according to the actual need and are not limited herein.

Specifically, the diffusion particles 221 is made of $SiO_2$. In some embodiments, the diffusion particles 221 may also be made of inorganic martials selected from: Si, $Al(OH)_3$, $Mg(OH)_2$, $Al_2O_3$, $ZrO_2$, $TiO_2$, or any mixture thereof. Certainly, in some other embodiments, the diffusion particles 221 may also be made of polymer material and achieve the same technical effect as the aforementioned embodiments. The specific material may be selected according to the actual need and are not limited herein as long as the requirements of the diffusion particles 221, such as density or refractive index, are met.

Specifically, the resin layer 222 is made of transparent poly epoxy resin. Certainly, in some other embodiments, the resin layer 222 is not limited to be made of poly epoxy resin. The resin layer 222 may also be made of other transparent resins, such as polyester resin and polyether resin etc., that can be cured by UV curing or heat curing. The same technical effect as achieved by the poly epoxy resin in the aforementioned embodiments may also be achieved by the UV curable or heat curable resin. The specific material may be selected according to the actual need and are not limited herein.

The anti-glare coating provided by the embodiments of the present disclosure can be applied to light emitting surface of objects including but not limited to: polarizer of high-resolution display devices, touch panels, or glass covers. Other unspecified objects that need surface anti-glare effect are also included. The included objects are not limited herein.

The beneficial effects of the embodiment of the present disclosure: the anti-glare film provided by the embodiments of the present disclosure is formed by curing the resin material and the plurality of spherical diffusion particles 221 which has a density less than the density of the resin material. After curing, the diffusion particles 221 is evenly distributed in the resin layer 222, and part of the volume of the diffusion particles 221 is exposed on the surface of the resin layer 222. Therefore, the surface haze of different parts of the anti-glare coating can be made the same, the uniformity of the surface haze of the anti-glare coating can be enhanced, and flashing points of the panel of the display device can be avoided without excessively enlarging the particle sizes of the diffusion particles.

Figure 4:
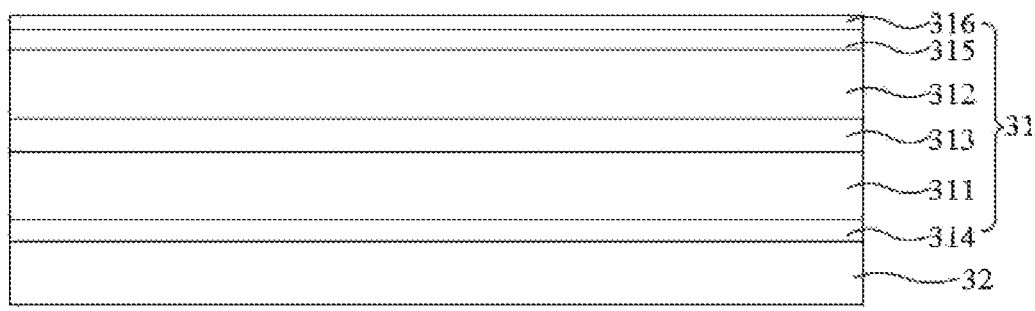
FIG. 4 is a structural schematic view of a display device provided by the embodiments of the present disclosure.

The embodiments of the present disclosure also provide a display device. The display device is described in detail with reference to FIG. 4, which is a structural schematic view of a display device 3 provided by the embodiments of the present disclosure. The display device 3 comprises a LCD panel 31 and a backlight module 32. The LCD panel 31 comprises an array substrate 311, a color film substrate 322, a liquid crystal layer 313, a first polarizer 314, and a second polarizer 315. The array substrate 311 and the color film substrate 312 are opposite to each other. The liquid crystal layer 313 is disposed between the array substrate 311 and the color film substrate 312. The first polarizer 314 and the second polarizer 315 is disposed on one side of the array substrate 311 and the color film substrate 312, respectively. The second polarizer 315 is disposed on the side of the color film substrate 312 away from the array substrate 311. The light emitting surface of the second polarizer 315 is coated with an anti-glare coating 316. The anti-glare coating 316 is the anti-glare coating 22 provided by the aforementioned embodiments. The structure of the anti-glare coating is not repeated here.

In the embodiment of the present disclosure, on the one hand, the anti-glare effect same as in the aforementioned embodiments may be effectively enhanced, and on the other hand, the flashing points caused by excessive particle sizes of the diffusion particles in the anti-glare coating 316 may be avoided by disposing the anti-glare coating 316 on the light emitting surface of the second polarizer 315.

Optionally, the display device is a display device with an external touch structure. The display device with the external touch structure further comprises a touch panel. The touch panel is disposed on one side of the display device away from the backlight module. The anti-glare coating same as the anti-glare coating provided in the aforementioned embodiments is also disposed on a light emitting surface of the touch panel. The anti-glare coating can avoid flashing points caused by the excessive particle sizes of the diffusion particles in the anti-glare coating while enhancing the anti-glare effect of the light emitting surface of the touch panel.

In summary, although the preferable embodiments of the present disclosure have been disclosed above, the embodiments are not intended to limit the present disclosure. A person of ordinary skill in the art, without departing from the spirit and scope of the present disclosure, can make various modifications and variations. Therefore, the scope of the discourse is defined in the claims.

What is claimed is:

1. A surface finishing method, comprising steps of:
providing a resin material, adding a plurality of spherical diffusion particles into the resin material to form an anti-glare material, wherein each of the plurality of diffusion particles has a same density, and the density of the diffusion particles is less than a density of the resin material;
coating the anti-glare material onto a surface of a substrate, wherein a thickness of the resin material in the anti-glare material coated on the surface of the substrate is greater than a particle size of the diffusion particles; and
performing a curing process of the anti-glare material to cure the resin material to form a resin layer, wherein the diffusion particles is evenly dispersed in the resin layer, and a part of a volume of the diffusion particles is exposed on a surface of the resin layer, thereby giving the substrate a predetermined surface haze.

2. The surface finishing method as claimed in claim 1, wherein the particle size of the diffusion particle is kept constant, and the volume of the part of the diffusion particles which are exposed from the resin layer is changed by increasing or decreasing a difference in density between the resin material and the diffusion particles, thereby giving the substrate the predetermined surface haze.

3. The surface finishing method as claimed in claim 1, wherein a difference in density between the resin material and the diffusion particles is kept constant, and the volume of the part of the diffusion particles which are exposed from the resin layer is changed by increasing or decreasing the particle size of the diffusion particles, thereby giving the substrate the predetermined surface haze.

4. The surface finishing method as claimed in claim 1, wherein the particle size of the diffusion particles is in a range of between 2 μm and 8 μm, and a thickness of the resin layer is in a range of between 5 μm and 10 μm.

5. The surface finishing method as claimed in claim 1, wherein an absolute value of a difference in particle size between the diffusion particles is less than or equal to 0.5 μm.

6. The surface finishing method as claimed in claim 1, wherein a refractive index of the diffusion particles is in a range of between 1.3 and 1.5, and a refractive index of the resin layer is in a range of between 1.55 and 1.8.

7. The surface finishing method as claimed in claim 1, wherein the diffusion particles include solid particles or hollow particles.

8. An anti-glare coating, formed by curing a resin material and a plurality of spherical diffusion particles, wherein each of the plurality of diffusion particles has a same density that is less than a density of the resin material, and the anti-glare coating comprises:
a resin layer; and
the plurality of spherical diffusion particles which are evenly dispersed in the resin layer, wherein a part of a volume of the diffusion particles is exposed on a surface of the resin layer, and a thickness of the resin layer is greater than a particle size of the diffusion particles.

9. The anti-glare coating as claimed in claim 8, wherein the particle size of the diffusion particles is in a range of between 2 μm and 8 μm, an absolute value of a difference in particle size between the diffusion particles is less than or equal to 0.5 μm, and the thickness of the resin layer is in a range of between 5 μm and 10 μm.

10. The anti-glare coating as claimed in claim 8, wherein a refractive index of the diffusion particles is in a range of between 1.3 and 1.5, and a refractive index of the resin layer is in a range of between 1.55 and 1.8.

11. The anti-glare coating as claimed in claim 8, wherein the diffusion particles include solid particles or hollow particles.

12. A display device, comprising:
an LCD panel and a backlight module, wherein the LCD panel comprises an array substrate, a color film substrate, and a pair of polarizers; the array substrate and the color film substrate are opposite to each other; the polarizers are disposed on both outer sides of the array substrate and the color film substrate, respectively; an anti-glare coating is coated on a light emitting surface of the polarizer disposed on the outer side of the color film substrate away from the array substrate; the anti-glare coating is formed by curing a resin material and a plurality of spherical diffusion particles, each of the plurality of diffusion particles has a same density that is less than a density of the resin material; and the anti-glare coating comprises:

a resin layer; and the plurality of spherical diffusion particles which are evenly dispersed in the resin layer, wherein a part of a volume of the diffusion particles is exposed on a surface of the resin layer, and a thickness of the resin layer is greater than a particle size of the diffusion particles.

13. The display device as claimed in claim 12, wherein the particle size of the diffusion particles is in a range of between 2 μm and 8 μm, an absolute value of a difference in particle size between the diffusion particles is less than or equal to 0.5 μm, and the thickness of the resin layer is in a range of between 5 μm and 10 μm.

14. The display device as claimed in claim 12, wherein a refractive index of the diffusion particles is in a range of between 1.3 and 1.5, and a refractive index of the resin layer is in a range of between 1.55 and 1.8.

15. The display device as claimed in claim 12, wherein the diffusion particles include solid particles or hollow particles.

* * * * *